United States Patent

[11] 3,607,002

| [72] | Inventor | Robert A. Meyers<br>Encino, Calif. |
|---|---|---|
| [21] | Appl. No. | 749,588 |
| [22] | Filed | Aug. 2, 1968 |
| [45] | Patented | Sept. 21, 1971 |
| [73] | Assignee | TRW Inc.<br>Redondo Beach, Calif. |

[54] PROCESS FOR REMOVING SULFUR OXIDES FROM GASEOUS MIXTURES
2 Claims, No Drawings

[52] U.S. Cl. .................................. 23/25,
23/178 S
[51] Int. Cl. .................................. B01d 53/16,
B01d 53/34
[50] Field of Search .................................. 23/2, 2.1,
178, 178 S; 55/73, 74

[56] References Cited
UNITED STATES PATENTS

| 2,992,895 | 7/1961 | Feustel et al. | 23/2 |
| 3,104,951 | 9/1963 | Urban | 23/225 |
| 3,423,180 | 1/1969 | Hoekstra | 23/225 |

*Primary Examiner*—Earl C. Thomas
*Attorneys*—Daniel T. Anderson, James V. Tuca and Alan D. Akers

ABSTRACT: This invention relates to a process for removing sulfur oxides, e.g., sulfur dioxide and sulfur trioxide, from hot gaseous mixtures by using a solid organic absorbent characterized as having high thermal stability and selected from the group consisting of aniline blacks, e.g., migrosine copper phthalocyanine, pyrolyzed polyacrylonitrile, and pyrolyzed polyvinylchloride.

PROCESS FOR REMOVING SULFUR OXIDES FROM GASEOUS MIXTURES

This invention is directed to a process for removing sulfur oxides from hot gaseous mixtures, including flue gases, smelter gases, and other gases emitted from various industrial operations such as in power generation, e.g., emissions from the combustion of coal and petroleum, refinery operations, coke processing, sulfuric acid manufacturing, etc. More specifically, this invention is directed primarily to the removal of sulfur oxides, i.e., sulfur dioxide and sulfur trioxide, from hot gases by using solid organic absorbents characterized as having a high thermal stability at emission gas temperatures. The solid absorbents of this invention are selected from the group consisting of aniline blacks, e.g., nigrosine, copper phthalocyanine, pyrolyzed polyacrylonitrile, and pyrolyzed polyvinylchloride.

The contamination of the atmosphere by sulfur oxides, whether present in power plant flue gases or in ore roaster gases, etc., has become a problem for public health more recently than ever before. The problem of air pollution has long been recognized primarily because of the irritating effects on one's respiratory system, in addition to the adverse effects on plant life and its corrosive attack on the various materials including metals, etc. It is estimated that tons of sulfur oxide are emitted into the atmosphere each year due primarily to the combustion of coal and fuel oil which is used for the generation of electric power and the like. While sulfur oxides are introduced into the atmosphere from a variety of emitters, the power-generating sources, e.g., the flue gas emissions, are a major source of air pollution. Thus the development of a process for controlling pollutants emitting from a power plant would result in the elimination of the single largest source of $SO_2$ pollution.

In an attempt to solve the problem, various processes have been proposed including, for example, the use of the liquid-phase absorption technique. This approach, however, has not been completely satisfactory in that the liquid functions as a coolant, thereby increasing the density of the gas which caused the cooler gas to settle in the vicinity of the stack.

Another approach to the problem has been the investigation of highly reactive but stable organic materials. The essential prerequisites for using these organic materials, however, depends upon their thermal stability and melting points which should be in the area of approximately 400° to 700° F. There are obviously a wide variety of organic compounds known to have melting points sufficiently high so that they would remain solid at temperatures of at least the lower limits of a typical flue gas. Many of the compounds having these characteristics, for example, include the polyimides, polybenzimidazoles, polyoxadiozoles, the condensation polymers, e.g., polyhydroxybenzoic acids and polyterephthalamides, the highly cross-linked polymers, the homocyclic aromatics the heterocyclic aromatics, and some of the hydrocarbons and derivatives.

However, while many of these organic materials have comparatively high melting points and good thermal stability, they were not, however, found to be satisfactory with respect to their absorbing and regenerating characteristics to be commercially useful as absorbents for sulfur oxide gases. Thus, it was found that of the unlimited number of solid organic materials available, only a few compounds, as more specifically set forth herein below, had the necessary prerequisites to be useful as an absorbent for sulfur oxides at flue gas temperatures. The materials or chemical compounds in accordance with this invention which exhibited outstanding thermo-oxidative stability and good absorbing and regenerating characteristics are the materials selected from the group consisting of the aniline blacks, e.g., nigrosine, copper phthalocyanine, pyrolyzed polyacrylonitrile and pyrolyzed polyvinylchloride.

Accordingly, it is an object of this invention to provide a process for removing sulfur oxides, e.g., sulfur dioxides, from hot gaseous mixtures without affecting or lowering the temperature thereof.

It is another object of this invention to provide a continuous process for removing sulfur oxide gases from hot gaseous mixtures, e.g., flue gases, by using a solid organic material which can be easily regenerated for continuous use.

It is still another object of this invention to provide a continuous process for absorbing sulfur oxide gases from hot flue gases by using a solid organic material capable of being regenerated with an inert gas from which the sulfur oxides may be conveniently removed by conventional means.

It is still a further object of this invention to provide a continuous process for removing sulfur oxides from hot flue gases by passing said gas over an organic absorbent characterized as having high-thermal stability and a melting point above the temperature of the flue gas.

It is still a further object of this invention to provide a continuous process whereby sulfur dioxide may be removed from hot flue gases by the use of solid organic materials characterized as having a high rate of absorption and capable of being regenerated in a continuous manner with an inert gas.

These and other objects of the invention will become apparent from a further and more detailed description of the invention as follows.

In accordance with this invention, the hot flue gases comprising sulfur dioxide are brought in contact with the solid organic material having a thermal stability above the temperature region of the gas. The organic absorbents are selected from the group consisting of aniline blacks, e.g., nigrosine, copper phthalocyanine, pyrolyzed polyacrylonitrile and pyrolyzed polyvinylchloride. It has been found that the aniline black dyes and its derivatives such as nigrosine have melting points greater than about 400° C. These dyes have repeating structural units which are thermally stable as characterized by the following formula:

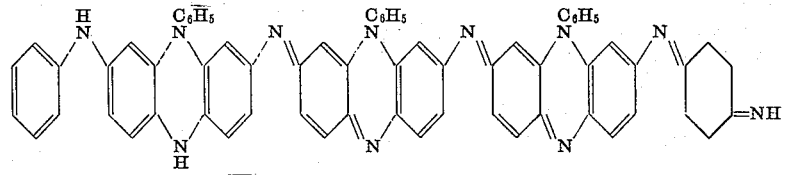

Aniline Black Derivative

Of the aniline blacks, the preferred is nigrosine which may be characterized as a water soluble sulfonated material having the general structure of aniline black. More specifically, nigrosine may be prepared, for example, by oxidizing aniline and aniline hydrochloride with nitrobenzene or nitrophenol. The thermogravimetric analysis of nigrosine in air indicates that the oxidative stability ranges between 500° and 600° F. Moreover, it was found that nigrosine has a TGA superior to most of the other thermally stable polymers. This is probably due to the ladder structure which is comparatively short but not substantially different from similar ladder polymers, e.g., polyimides, polybenzimidazoles, etc.

In order for a given interaction of an organic solid to be of practical use in the absorption of sulfur dioxide from fuel combustion emissions, the interaction must not only be efficient, and take place at temperatures encountered in the emission stacks, but also must be either reversible by some mechanism to regenerate the solid and sulfur dioxide or must lead to some economically useful product comprising a combination of the two. Thus with these general requirements, it was necessary to determine whether or not the reaction or interaction of sulfur dioxide with the organic solids of this invention, e.g., nigrosine, took place either under the theory of absorption, electron transfer, an addition reaction, a substitution reaction, or an insertion reaction.

Of these reactions, it is believed that the aniline blacks, e.g., nigrosine and copper phthalocyanine come under what might be referred arbitrarily to as the absorption phenomena. It is known, for example, that both the cationic and anionic ion-exchange materials may reversibly absorb sulfur dioxide at temperatures as high as their thermal stability would permit and that the capacity of absorption and desorption was reasonably satisfactory. Thus, it is obvious that the absorption phenomena is a practical way of explaining why the organic solids of this invention may be used to remove sulfur dioxide from emission streams, since the absorption theory has been shown to be reversible and the reaction takes place at temperatures approaching those encountered in flue gases. Moreover, theoretically, sulfur dioxide may act either as a charge-transfer acceptor or a charge-transfer donor to give a charge-transfer complex. These complexes may be described as having undergone a partial transfer of an electron from a donor to an acceptor molecule. Since these complexes are in equilibrium, they are reversible either through changes in the polarity of the environment or through displacement of the equilibria.

With respect to the pyrolyzed polyvinylchloride, it is known that sulfur dioxide, for example, undergoes addition reactions across single double bonds or pairs of conjugated double bonds. Thus, it is believed that the polyvinylchloride polymers which are thermally stable and contain a backbone of conjugated double bonds react with sulfur dioxide to give a series of Diels-Alder reactions. These reactions are reversible upon heating, so that the polymer can be regenerated with an inert gas.

To establish the fact that organic solids do indeed absorb sulfur dioxide, for example, from a moving gas stream at elevated temperatures, a preliminary test was run on a representative number of organic compounds. In order to obtain a large surface area of each of the materials, the absorbents were coated on a firebrick support. The coating of the firebrick was accomplished by dissolving the absorbent in a solvent followed by mixing with the firebrick in amounts to obtain a coating containing approximately 1 percent by weight of the organic material. Subsequently, the solvent was removed, under a vacuum, and stainless steel columns were packed with the coated firebrick. The packed columns were placed in an oven at 240° C. and allowed to come up to temperature. At one end of the column a gas stream was connected which carried approximately 20 cc./min. of nitrogen and 45 cc./min. of sulfur dioxide. The other end of the column was connected to a bubble tower containing about 50 milliliters of water with iodine to impart a faint yellow color. The gas stream was allowed to flow through the packed column until the color of the solution faded. At this point, there was an indication that sulfur dioxide began to emit from the column as the color of the iodine solution began to fade. The amount of sulfur dioxide absorbed on each of the columns is illustrated in table I.

Sulfur Dioxide Retained in Column

| Absorbent | $SO_2$ Flow (cc./min.) | $N_2$ Flow (cc. min.) | $SO_2$ Adsorbed (g./g. of adsorbent) |
|---|---|---|---|
| 8-hydroxyquinoline-formaldehyde polymer | 45 | 20 | 0.6 |
| Poly(N-vinylcarbazole) | 45 | 20 | 0.8 |
| Polyimide | 45 | 20 | 0.7 |
| Nigrosine | 45 | 20 | 1.2 |
| Nigrosine | 5 | 20 | 3.6 |

The nigrosine, saturated with sulfur dioxide, was subsequently regenerated by passing 60 cc./min. of nitrogen through the column for about one-half hour while the column was maintained at a temperature of about 240° C. The regenerated column was then evaluated with a 45 cc./min. flow of sulfur dioxide and it was found that the column retained approximately two-thirds as much sulfur dioxide as it originally retained.

A typical fuel gas combustion emission stream comprises a substantial amount of oxygen, water, carbon dioxide and nitrogen oxides in addition to the sulfur oxides. Thus, the long-term stability of the organic absorbers must depend upon the absorbers' inertness with respect to these gases. Moreover, since oxygen is present in relatively high concentrations and is one of the most deletrious gases in the flue gas mixture, the stability of the absorbent in an atmosphere comprising oxygen, under these conditions, is essential to obtain satisfactory results. A representative flue gas composition is illustrated in table II.

Flue Gas Composition

| Component | % By Volume |
|---|---|
| $N_2$ | 74.90 |
| $CO_2$ | 14.70 |
| $H_2O$ | 7.25 |
| $O_2$ | 2.80 |
| $SO_2$ | 0.30 |
| $NO_x$ | 0.05 |
| Fly-Ash | 0.2 (weight) |

The following examples further illustrate the effectiveness of the solid organic materials of this invention to absorb sulfur oxide gases. A gaseous mixture comprising 30 percent by volume of sulfur dioxide was passed through a column at a temperature of about 250° C. at a rate of approximately 25 cc.'s per minute. The inside surface area of the column was coated with approximately 10 percent by weight of the organic absorbent on firebrick. The measuring time began with the flow of the gas through the column and continued until traces of the sulfur dioxide emitted from the opposite end. Under these conditions, 10 percent by weight of pyrolyzed polyvinylchloride on firebick was used as the absorbent and was found to absorb approximately 50 milligrams of sulfur dioxide per gram of material. The absorbent was subsequently regenerated by passing nitrogen at a flow rate of about 70 ml.'s per minute over a period of about one-half hour which indicated that approximately 78 percent of the pyrolyzed polyvinylchloride was regenerated.

The test was repeated wherein 10 percent by weight of copper phthalocyanine was found to absorb approximately 40 milligrams of sulfur dioxide per gram of material. Again, nitrogen was used to regenerate the phthalocyanine by using the inert gas at a rate of about 75 ml's per minute for about 30 minutes, and it was found that approximately 100 percent of the absorbent was regenerated with the nitrogen. Similarly, firebrick was coated with approximately 10 percent by weight of pyrolyzed polyacrylonitrile and it was found that approximately 60 milligrams of sulfur dioxide were absorbed per gram of material. The absorbent was subsequently regenerated with nitrogen at a flow rate of about 75 ml.'s per minute and approximately 60 percent of the polymer was regenerated.

As the absorbent, e.g., nigrosine, becomes saturated with these sulfur oxide gases, the spent material may be generated by using effective amounts of nitrogen gas at regeneration temperatures in amounts ranging from approximately three to six times that amount of the flue gas which initially passed through the absorbing stack. The nitrogen gas mixture may be treated by various means for purposes of recovering the sulfur oxides. This way includes, for example, the use of water as a scrubbing agent which converts the oxides to sulfurous acids while the nitrogen is recycled through the regenerating process. It is obvious that there are other means by which the absorbing material may be used to remove sulfur dioxide, for example, from various gaseous mixtures other than by using a coated stack as specifically set forth herein above. It is essential only that sufficient surface areas of the organic absorbent be available to absorb the sulfur oxides from the gaseous mixtures in quantities and at operating temperatures sufficient to make the process commercially feasible. Similarly, it is obvious that the absorbent may be regenerated by means other than the use of an inert gas, i.e., nitrogen. For practical purposes, however, the preferred procedure comprises of the use of a coated stack containing sufficient amounts of organic absorbent to remove the sulfur oxides from the emission gases followed by a regeneration process whereby the material is regenerated to the extent that eventually it may become necessary to replace the spent material with additional absorbent.

Initially, the absorbers of this invention were designed to remove approximately 90 percent or more of the total amount of sulfur oxides in the flue gases with a more complete removal being possible at a higher operating cost. The flue gas rises against the absorber which picks up the sulfur oxides as it flows at a gas velocity ranging from about 20 to 30 feet per second. The ratio of absorbent to feedgas, however, is adjusted according to the amounts of sulfur oxide in the gas emissions. Thus, for example, for flue gases containing 2,000 to 2,500 parts per million of sulfur oxide, the ratio of the absorbent to the gas feed may be adjusted to obtain optimum absorption.

While this invention has been described with respect to a number of specific embodiments, it is obvious that there are other variations and modifications which may be resorted to without departing from the spirit and scope of the invention as particularly pointed out in the appended claims.

I claim:

1. A continuous process for removing sulfur oxides from mixtures of gases which comprises passing said gases over nigrosine at temperatures ranging from about 200° C. to 350° C. for a period sufficient to remove the sulfur oxides from the mixtures and regenerating said nigrosine by contacting same with an inert gas at temperatures ranging from about 250° C. to 400° C.

2. A continuous process for removing sulfur oxides from mixtures of gases which comprises passing said gases over copper phthalocyanine at temperatures ranging from about 200° C. to 350° C. for a period sufficient to remove the sulfur oxides from said mixtures and regenerating said copper phthalocyanine by contacting same with an inert gas at temperatures ranging from about 250° C. to 400° C.